S. G. CRAVER.
FAN ATTACHMENT FOR CULTIVATORS.
APPLICATION FILED SEPT. 25, 1912.
1,123,854.
Patented Jan. 5, 1915.
2 SHEETS—SHEET 2.
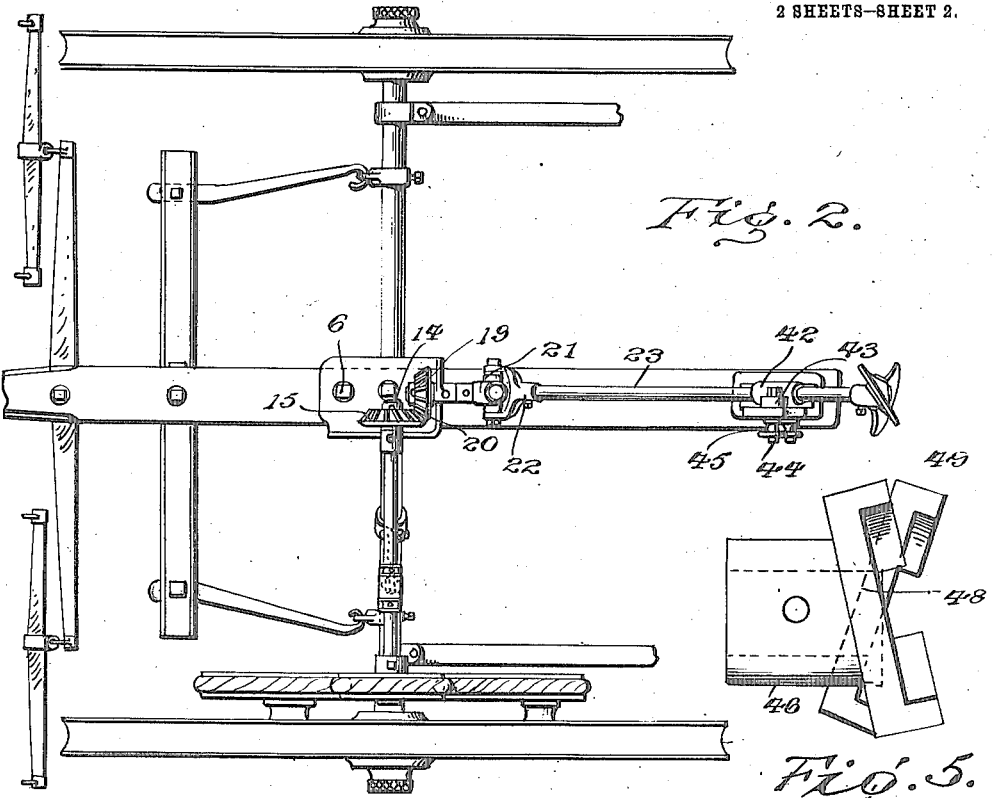
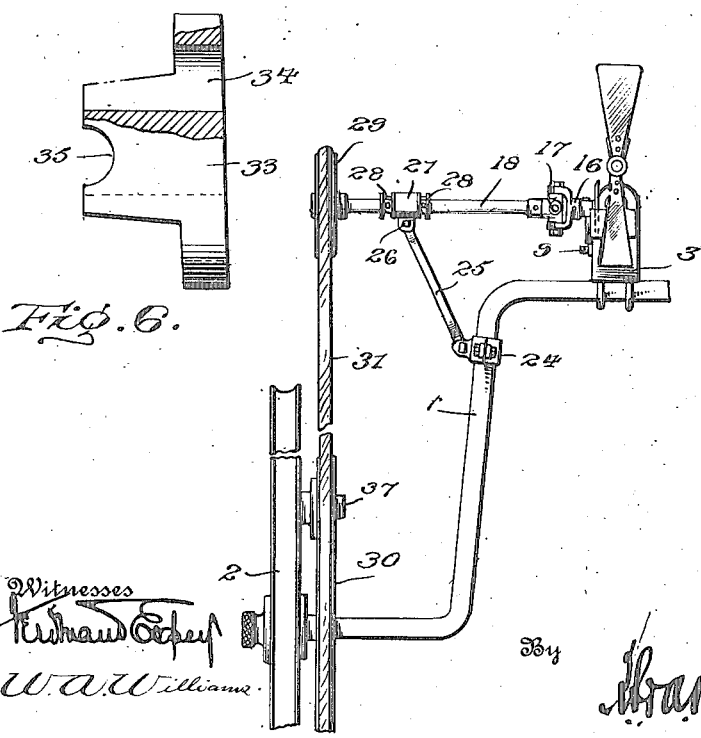
Inventor
S. G. Craver.
By
Attorneys
Witnesses

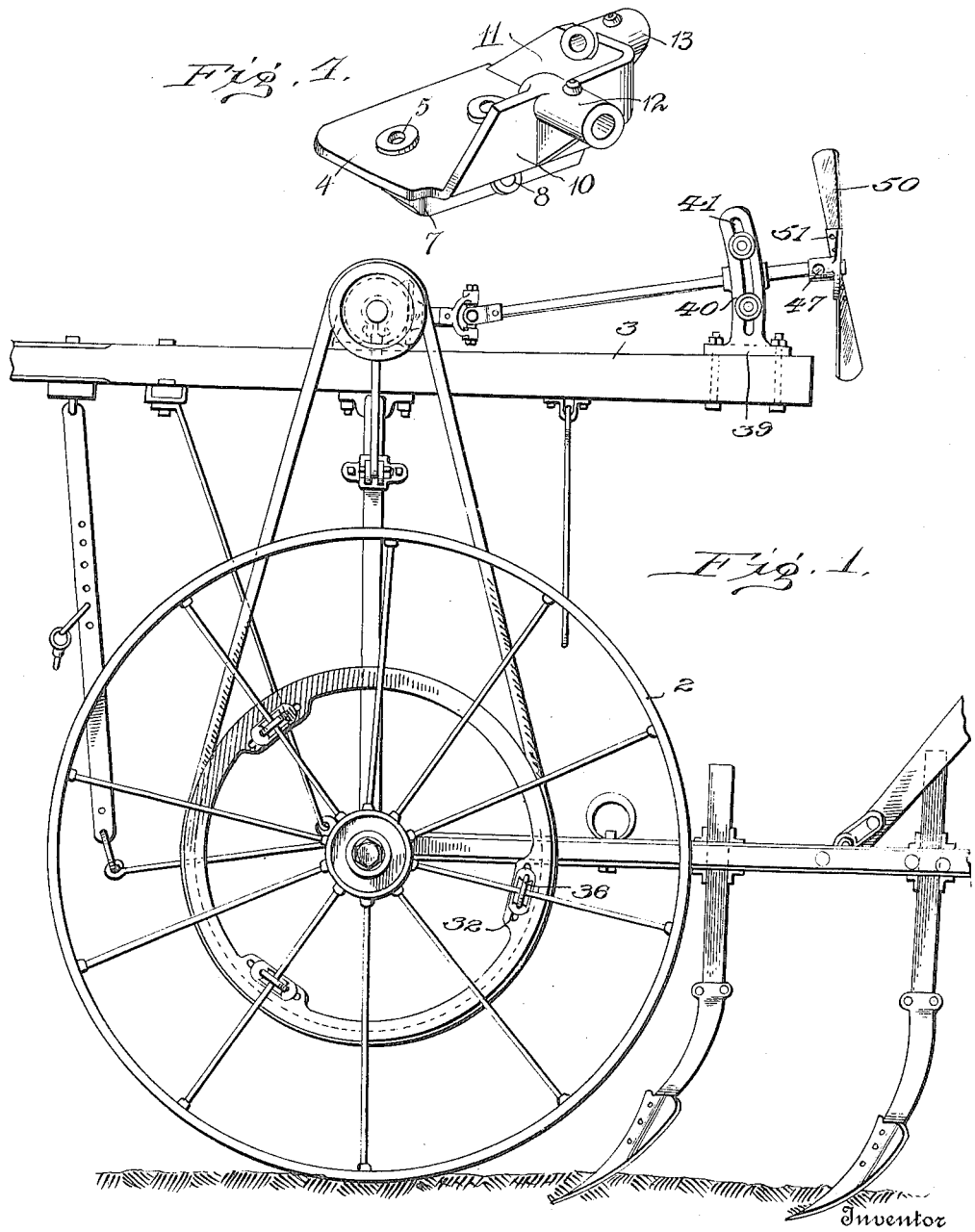

UNITED STATES PATENT OFFICE.

STEPHEN G. CRAVER, OF SEARSBORO, IOWA.

FAN ATTACHMENT FOR CULTIVATORS.

1,123,854.  Specification of Letters Patent.  Patented Jan. 5, 1915.

Application filed September 25, 1912. Serial No. 722,312.

*To all whom it may concern:*

Be it known that I, STEPHEN G. CRAVER, citizen of the United States, residing at Searsboro, in the county of Poweshiek and State of Iowa, have invented certain new and useful Improvements in Fan Attachments for Cultivators, of which the following is a specification.

This invention relates to fan attachments for cultivators and like farm implements, and has as its object to provide an attachment of this class which may be applied to any ordinary cultivator, or like implement, and which will direct a forceful draft in the direction of the operator of the implement.

It is one aim of the invention to so construct the attachment that the fan may be adjusted, without affecting its driving mechanism in any way whatsoever, so as to direct a blast of air at the proper angle to suit the operator.

The invention further aims to provide novel means for supporting the fan for angular adjustment upon the tongue of a cultivator.

For a full understanding of the invention reference is to be had to the following description and accompanying drawings, in which:—

Figure 1 is a view in side elevation of the present invention applied to a cultivator. Fig. 2 is a top plan view thereof. Fig. 3 is a rear elevation of the device applied. Fig. 4 is a perspective view of the bearing for the drive and driven shafts. Fig. 5 is a plan view of the hub of the fan. Fig. 6 is a view partly in plan and partly in section of one of the devices for spacing the drive pulley from that wheel of the cultivator upon which it is mounted.

Corresponding and like parts are referred to in the following description and indicated in all the views of the accompanying drawings by the same reference characters.
In the drawings, the arched frame of the cultivator is indicated by the numeral 1, the ground wheels supporting this frame by the numeral 2, and the tongue by the numeral 3. Such parts of the cultivator as are not essential to an understanding of the construction and arrangement of the attachment embodying the present invention, have been omitted from the drawing, to a greater or less extent and will not be described.
The fan proper of the attachment is carried by a shaft which is rotated through the medium of a countershaft driven from one of the wheels 2 and for convenience in describing the construction and arrangement of the attachment the gearing for transmitting motion from the last mentioned shaft to the first mentioned shaft will first be described. The bearing for the gearing consists in part of an attaching plate 4 which is disposed upon the upper side of the tongue 3 and is formed with openings 5 through which and the said tongue are secured bolts 6. The plate 4 is formed upon its under side with a depending flange 5 having an opening 8 through which and the said tongue is secured a bolt 9. At one lateral edge the plate 4 is formed with an upstanding flange 10 and at its forward edge with an upstanding flange 11 located in a plane at right angles to the flange 10. The flanges 10 and 11 are formed respectively with bearing sleeves 12 and 13. A shaft 14 is journaled in the bearing sleeve 12 and has fixed upon it inwardly of the flange 10 a beveled gear 15. One member 16 of a universal joint is secured to the other end of the shaft 14. The other member of the universal joint indicated at 17, is fixed at one end of a shaft 18 which is mounted for rotation in a manner which will be presently explained and is to be driven from one of the wheels 2. A shaft 19 is journaled in the bearing sleeve 13 and has fixed upon it a beveled gear 20 which is in mesh with the gear 15. One member 21 of the universal joint is fixed upon the other end of the shaft 19 and the other member 22 of this joint is fixed upon the rear end of a shaft 23 which is the fan-shaft of the attachment. At this point it will be noted that the shafts 18 and 23 extend substantially at right angles to each other.

A two-part clip 24 is bolted onto one of the depending legs of the arched frame 1 of the cultivator and pivoted at its lower end to one member of this clip is an arm 25 the upper end of which is pivoted to an ear 26 formed on the under side of a sleeve bearing 27 in which is rotatably mounted the shaft 18, collars 28 being fixed upon the shaft 18, one at each end of the said sleeve bearing 27. It is to be understood that the collars 28 serve to hold the shaft 18 against sliding movement through the bearing 27. It will be observed from inspection of Figs. 1, 2 and 3 of the drawings that a grooved pulley 29 is fixed upon the outer end of the shaft 18 and that a similar pulley, although of larger diameter, indicated by the numeral 30 is supported for rotation with and upon one of the wheels 2. A cable 31 is trained about the pulleys 29 and 30 and serves to transmit power from the wheel 2 to the shaft 18. The pulley 30 is in the nature of an annular grooved body formed at suitable intervals with transversely extending slots 32 and disposed against one face of the said body at the point of location of each of the slots 32 is a spaced head 33 formed with openings 34 located adjacent to its ends, and in one face with a notch 35, the wall of which bears against the inner side of one of the spokes of the wheel. U-bolts 36 are fitted at their ends through the said openings 34 in the spacing heads 33 and through the slots 32 and upon the ends of these bolts are threaded nuts 37 which bear against the inwardly presented side face of the pulley 30.

As before stated, the fan-shaft is mounted for angular adjustment, and in order that it may be held at the desired adjustment, means is provided which will now be described. A plate 39 is secured upon the tongue 3 at the rear end thereof and this plate is formed or provided with an upstanding arcuate arm 40 having a slot 41 therein. The slot 41 extends on the arc of a circle, the center of which is the axis of the universal joint comprising the members 21 and 22. A bearing sleeve 42 rotatably receives the shaft 23 and this sleeve is formed with ears 43 through which and the slot 41 are engaged bolts 44. Nuts 45 are fitted upon the bolts 44 and may be tightened to bear against that side of the arm 40 opposite the side against which the ears 43 are disposed. In this manner the bearing sleeve 42 may be held at the desired adjustment. The fan proper of the attachment is supported at the rear end of the shaft 23 and this fan includes a hub 46 which is preferably secured upon the said end of the shaft by means of a pin 47 driven through the hub and the shaft. At diametrically opposite sides the hub 46 is formed or provided with relatively angularly disposed wings 48 having lateral flanges 49. The fan-blades 50 are disposed at their inner ends one against the rearwardly presented face of each wing 48 and with its lateral edges abutting against the flanges 49. Bolts 51 are secured through the said inner ends of the blades and through the wings 48 and serve to hold the blades firmly to the wings.

From the foregoing description of the invention it will be seen that there is provided a fan-attachment for cultivators which is simple in construction, cheap to manufacture, and which can be operated without requiring manual attention, or power other than that derived from the ground wheels of the machine. It will also be seen that the fan-shaft may be readily and quickly adjusted to assume various angles in order that the breeze from the fan may be directed to suit the operator of the machine.

Having thus described the invention what is claimed as new is:—

1. In a device of the character described, the combination with a wheeled traction frame, of a driving shaft formed in two sections, a universal joint connecting said sections, a driven shaft extending at an angle to the driving shaft and also formed in two sections, a universal joint connecting said sections, a supporting member in which the inner sections of the driving and driven shafts are rotatably supported, intermeshing gear wheels carried on said inner sections, means mounted on the frame for adjustably supporting the outer section of the driving shaft and vertically adjusting the free end of said outer section, means for supporting and vertically adjusting the free end of the driven shaft, a fan carried upon the extremity of the driven shaft, and means carried upon the extremity of the driving shaft whereby power may be taken from the wheels of the cultivator.

2. In a device of the character described, the combination with a frame and traction wheels therefor, of a driving shaft formed in two sections, a universal joint connecting said sections, said drive shaft extending approximately parallel to the axle of the cultivator, a driven shaft formed in two sections, a universal joint connecting said sections, the driven shaft extending approximately at right angles to the driving shaft, means for transmitting the motion of the driving shaft to the driven shaft, means supporting the inner sections of the driving and driven shafts, a band-wheel mounted upon one of the wheels of the frame, a pulley mounted upon the extremity of the driving shaft, a band connecting said band-wheel and pulley, means for supporting and vertically adjusting the free end of the outer section of the driving shaft to thereby tighten the said band, means for supporting and vertically adjusting the free end of the outer section of the driven shaft, and a fan carried upon said driven shaft.

3. In a device of the character described, the combination with a frame, and traction wheels therefor, of a drive shaft formed in two sections, a universal joint connecting said sections, said shaft extending approximately parallel to the axis of the traction wheels, a driven shaft extending at right angles to the drive shaft and also formed in two sections, a universal joint connecting said sections, a supporting member supporting the inner ends of the inner sections of the driving and driven shafts, intermeshing beveled gear wheels on said shafts, a band wheel mounted upon one of the traction wheels, a pulley mounted on the extremity of the driving shaft, a band operatively connecting the pulley and band-wheel, means for supporting and vertically adjusting the free end of the driving shaft, said means comprising a sleeve surrounding the driving shaft, a clamp engageable with the frame, and an arm having pivotal engagement with the clamp and sleeve, means for supporting and vertically adjusting the free extremity of the driven shaft, and a fan mounted upon the extremity of the driven shaft.

4. In a device of the character described, the combination with an arched frame, and traction wheels carried upon the ends of the arched frame, of a fan attachment comprising a driving shaft made in two sections connected by a swivel joint, said shaft extending above the axis of the traction wheels, a driven shaft formed in two sections connected by a universal joint and extending approximately at right angles to the driving shaft, a supporting member rotatably supporting the inner sections of both shafts, gearing connecting said shafts, transmission mechanism disposed between one of said traction wheels and the free extremity of the driving shaft, and driving the one from the other, a supporting and adjusting device for the driving shaft comprising a sleeve engaging the free end of the driving shaft and within which the driving shaft rotates, a clamp adapted to be engaged with the arched frame, a brace pivoted to the clamp and to the sleeve, a fan mounted upon the extremity of the driven shaft, means for vertically adjusting the free extremity of the driven shaft including an arcuately slotted bracket, and a bearing member through which the shaft section passes, said bearing member having adjusting screws entering the slot of the bracket.

5. A fan attachment for cultivators of the character described, including a bearing bracket adapted to be attached to a cultivator frame and having journal bearings disposed in angular relation, a driving shaft formed in two sections, connected by a universal joint, a driven shaft formed in two sections connected by a universal joint, the inner sections of the driving and driven shafts being supported in said journal bearings, a pulley carried upon the end of the driving shaft, means for vertically adjusting and supporting the free end of the driving shaft, said means comprising a sleeve through which the shaft passes, a link pivoted to the sleeve and a clamp pivoted to the link, means for vertically supporting and adjusting the free extremity of the driven shaft comprising a bracket adapted to be attached to the cultivator frame and having upwardly extending slotted portions, and a bearing through which the free end of the driven shaft passes, said bearing having slots engaging the slots of said bracket.

In testimony whereof I affix my signature in presence of two witnesses.

STEPHEN G. CRAVER. [L. S.]

Witnesses:
 JAMES DALTON,
 JAMES H. FRUSH.